(12) United States Patent
Chadli et al.

(10) Patent No.: US 10,805,277 B2
(45) Date of Patent: Oct. 13, 2020

(54) SYSTEM FOR SECURING EXCHANGES BETWEEN A COMMUNICATING THING AND A SERVICES PLATFORM

(71) Applicant: Orange, Paris (FR)

(72) Inventors: Youssef Chadli, Issy les Moulineaux (FR); Antoine Mouquet, Courbevoie (FR)

(73) Assignee: ORANGE, Paris (FR)

( * ) Notice: Subject to any disclaimer, the term of this patent is extended or adjusted under 35 U.S.C. 154(b) by 174 days.

(21) Appl. No.: 15/524,674

(22) PCT Filed: Nov. 4, 2015

(86) PCT No.: PCT/FR2015/052982
§ 371 (c)(1),
(2) Date: May 5, 2017

(87) PCT Pub. No.: WO2016/071636
PCT Pub. Date: May 12, 2016

(65) Prior Publication Data
US 2017/0317992 A1 Nov. 2, 2017

(30) Foreign Application Priority Data
Nov. 5, 2014 (FR) ...................................... 14 60656

(51) Int. Cl.
*H04L 29/06* (2006.01)
*H04W 4/70* (2018.01)
(Continued)

(52) U.S. Cl.
CPC ........ *H04L 63/0471* (2013.01); *H04L 9/0827* (2013.01); *H04L 9/3234* (2013.01);
(Continued)

(58) Field of Classification Search
CPC ..... H04W 12/02; H04W 12/04; H04W 12/08; H04W 12/12; H04W 12/00; H04W 8/20;
(Continued)

(56) References Cited

U.S. PATENT DOCUMENTS 7,684,793 B2 * 3/2010 Jiang ....................... H04W 8/02
455/432.1
8,131,281 B1 * 3/2012 Hildner ............... H04L 41/0806
455/418
(Continued)

FOREIGN PATENT DOCUMENTS

EP 2621205 A1 7/2013

OTHER PUBLICATIONS

International Search Report dated Feb. 3, 2016 for corresponding International Application No. PCT/FR2015/052982, filed Nov. 4, 2015.
(Continued)

*Primary Examiner* — Tae K Kim
(74) *Attorney, Agent, or Firm* — David D. Brush; Westman, Champlin & Koehler, P.A.

(57) ABSTRACT

A security system makes secure exchanges between a services platform and a communicating thing, which includes a control device. The system further includes a server, referred to as a "mediation" server, which receives a message, referred to as a "first" message, from the services platform, encrypts the first message, and sends the encrypted first message to the communicating thing. The communicating thing is also fitted with an IC card that is distinct from the control device and that decrypts the encrypted first message and sends the decrypted first message to the control device. The encryption and decryption operations are performed by at least one secret key shared between the mediation server and the IC card.

16 Claims, 3 Drawing Sheets

(51) Int. Cl.
*H04L 29/08* (2006.01)
*H04L 9/32* (2006.01)
*H04L 9/08* (2006.01)
*H04W 12/00* (2009.01)
*H04W 12/04* (2009.01)
*H04W 4/60* (2018.01)

(52) U.S. Cl.
CPC .......... *H04L 63/06* (2013.01); *H04L 63/0853* (2013.01); *H04L 67/025* (2013.01); *H04L 67/125* (2013.01); *H04W 4/70* (2018.02); *H04W 12/0013* (2019.01); *H04W 12/04* (2013.01); *H04W 4/60* (2018.02)

(58) Field of Classification Search
CPC ....... H04W 8/205; H04W 8/18; H04W 8/183; H04W 8/22; H04W 8/24
See application file for complete search history.

(56) References Cited

U.S. PATENT DOCUMENTS

| | | | | |
|---|---|---|---|---|
| 9,240,989 | B2* | 1/2016 | Chastain | H04L 63/08 |
| 9,313,660 | B2* | 4/2016 | Chastain | H04W 12/06 |
| 2008/0057946 | A1* | 3/2008 | Sato | H04W 8/245 |
| | | | | 455/425 |
| 2008/0146280 | A1* | 6/2008 | Sasse | H04W 8/183 |
| | | | | 455/558 |
| 2010/0227588 | A1* | 9/2010 | Bradley | H04W 12/0802 |
| | | | | 455/411 |
| 2010/0322425 | A1* | 12/2010 | Park | H04L 63/0428 |
| | | | | 380/270 |
| 2011/0007899 | A1* | 1/2011 | Park | H04W 4/50 |
| | | | | 380/270 |
| 2012/0124658 | A1* | 5/2012 | Brudnicki | G06Q 20/204 |
| | | | | 726/9 |
| 2013/0260739 | A1* | 10/2013 | Saino | G06F 9/547 |
| | | | | 455/419 |
| 2014/0040988 | A1* | 2/2014 | Nozulak | H04W 8/205 |
| | | | | 726/3 |
| 2014/0052992 | A1* | 2/2014 | Nozulak | H04L 63/0428 |
| | | | | 713/171 |
| 2014/0122878 | A1 | 5/2014 | Cho et al. | |
| 2014/0143534 | A1* | 5/2014 | Chastain | H04L 63/0428 |
| | | | | 713/150 |
| 2015/0127938 | A1* | 5/2015 | Chastain | H04L 63/08 |
| | | | | 713/168 |
| 2015/0127945 | A1* | 5/2015 | Chastain | H04W 12/06 |
| | | | | 713/170 |

OTHER PUBLICATIONS

English translation of the International Written Opinion dated Feb. 3, 2016 for corresponding International Application No. PCT/FR2015/052982, filed Nov. 4, 2015.
"3rd Generation Partnership Project; Technical Specification Group Core Network and Terminals; Universal Subscriber Identity Module (USIM) Application Toolkit (USAT) (Release 12)", 3GPP Standard, 3GPP TS 31.111, 3rd Generation Partnership Project (3GPP), MObile Competence Centre; 650, Route Des Lucioles; F-06921 Sophia-Antipolis Cedex; France, vol. CT WG6, No. V12.4.0, Jul. 2, 2014 (Jul. 2, 2014), pp. 1-130, XP050774535.

* cited by examiner

SYSTEM FOR SECURING EXCHANGES BETWEEN A COMMUNICATING THING AND A SERVICES PLATFORM

CROSS-REFERENCE TO RELATED APPLICATIONS

This Application is a Section 371 National Stage Application of International Application No. PCT/FR2015/052982, filed Nov. 4, 2015, the content of which is incorporated herein by reference in its entirety, and published as WO 2016/071636 on May 12, 2016, not in English.

FIELD OF THE DISCLOSURE

The present invention relates to communicating things suitable for performing certain tasks under the control of a services platform and/or for sending data, e.g. the results of measurements, to a services platform. More particularly, the present invention relates to securing exchanges between such a communicating thing and a services platform.

The communicating things to which the invention applies are extremely varied. By way of example, such a thing may be a thermometer, possibly having an audible alarm, a set of scales, a presence sensor, traffic lights where it is possible to control which lights are on, a window that can be controlled to open and close, an oven providing various possibilities concerning cooking duration and temperature, etc.

BACKGROUND OF THE DISCLOSURE

By the way they act, such things are capable of facilitating numerous aspects of everyday life. By way of example, these actions can render:
- home automation services for controlling things in a home (also referred to as a "smarthome"); or
- town management services, e.g. concerning parking meters, trash cans, traffic lights, speed radars; or indeed
- health services, in particular monitoring patients remotely.

The physical medium for communication between such communicating things and services platforms may be of any type. It is equally possible to use a wired connection (cable, Ethernet, optical fiber, etc.) or a wireless connection (cellular network, WiFi, Bluetooth, etc.).

Unfortunately, the fact that these things can communicate remotely exposes them to malicious attacks. With certain services, such attacks can have repercussions that are disastrous.

By way of example, and with reference to FIG. 1, consider a traffic light 1 having a transceiver 8 suitable for transmitting and receiving control messages, and remotely operated by a services platform 2 (e.g. situated within a police station) so as to adapt the (green/amber/red) color changes to traffic conditions; a malicious intrusion in such a system could disturb road traffic, with serious risks of accidents.

It is therefore necessary in the context of numerous services to make secure the exchanges between a communicating thing and the services platform with which it communicates.

As shown in FIG. 1, consideration might be given to making secure the communications channel 3 between the communicating thing 1 (or more precisely the device 4 installed by the manufacturer and controlling the actions of the communicating thing 1) and the services platform 2 (or more exactly its control interface 5). By way of example, the secure channel 3 could make use of an encryption key shared between the control device 4 and the control interface 5.

However, such a solution would be very inconvenient to implement on an industrial scale. Specifically:
- concerning services platforms, they are, a priori, not fitted with means for producing and distributing encryption/decryption keys; and
- concerning communicating things, they are, a priori, not fitted with encryption and decryption means; furthermore, incorporating a personalized encryption key in each communicating thing would make the manufacturing process considerably more complicated, thereby significantly increasing the costs of fabrication (in particular for communicating things of structure that is relatively simple and of operation that is relatively rudimentary).

SUMMARY

The present invention thus relates to a security system for making secure exchanges between a services platform and a communicating thing comprising a control device. Said system is remarkable in that it further comprises a server referred to as a "mediation" server possessing means for receiving a message, referred to as a "first" message, from said services platform, for encrypting said first message, and for sending the encrypted first message to said communicating thing, and in that the communicating thing is also fitted with an IC card that is distinct from said control device and that possesses means for decrypting said encrypted first message and for sending the decrypted first message to the control device, the encryption and decryption operations being performed by means of at least one secret key shared between the mediation server and said IC card.

It should be observed that in the context of the present invention, the term "IC card" designates an integrated circuit, e.g. of the universal integrated circuit card (UICC) type in compliance with ISO standard 7816. It may in particular be a "USIM card" as defined in the third generation partnership project (3GPP) specifications TS 31.102 and TS 21.1112, or it may be a "SIM card" as defined in 3GPP specification TS 51.0111, or any other analogous thing associated with a telecommunications operator.

It should also be observed that said mediation server, and also said services platform, may each comprise a single physical server, or else a plurality of physical servers using a distributed architecture.

By way of example, said first message may contain one or more commands for actuating the communicating thing.

Thus, the invention proposes taking advantage of the fact that a method already exists for distributing encryption/decryption keys that is both very widespread and very reliable, namely distributing IC cards under the responsibility of telecommunications operators. The IC card and the mediation server of the invention may for example be conveniently managed by the same telecommunications operator.

Furthermore, conventional IC cards incorporate a microprocessor and are programmable: it is thus perfectly possible to program an IC card (e.g. by means of a Java "applet") so as to make it capable of encrypting or decrypting messages with an encryption/decryption key stored in secure manner in the IC card.

It may be observed that control messages exchanged between the IC card and the control device need not necessarily be encrypted, particularly when these two elements are incorporated within a package that is considered to be tamperproof. Furthermore, if the link between the services platform and the mediation server might be liable to malicious intrusions, then the exchanges between those two entities may themselves naturally be encrypted or signed.

In any event, the solution of the invention is advantageously simple and inexpensive since the managers of the services platform no longer need to be concerned about producing and distributing encryption/decryption keys. Furthermore, the IC card is preferably incorporated in the package of the communicating thing to which it is fitted, such that the manufacturers of communicating things need only seal an IC card (such as an "embedded SIM") in each communicating thing, or make provision in each communicating thing for a standard housing for receiving an IC card (together with the connections between the IC card and the control device).

It should be observed that in the field of mobile telephony, IC cards are conventionally used at the beginning of a telephone call for mutual authentication between the user of the telephone and the mobile network, and for producing a session key, but that after those preliminary steps, the call is encrypted/decrypted by the telephone without any participation by the IC card. In contrast, in the present invention, all of the communications between the services platform and the control device of the communicating thing are intercepted and encrypted/decrypted by the IC card.

According to certain particular characteristics, said IC card further possesses means for receiving a message, referred to as a "second" message, from said control device, and for encrypting said second message, and said mediation server further possesses means for receiving the encrypted second message from said communicating thing, for decrypting said encrypted second message, and for sending the decrypted second message to said services platform, the encryption and decryption operations being performed by means of at least one secret key shared between said mediation server and the IC card.

For example, in a security system of the invention comprising firstly a single physical mediation server and secondly a services platform constituted by two physical servers situated at some distance apart from each other, said first message may be sent to the mediation server by one of the servers of the services platform, and said second message may be sent by the mediation server to the other server of the services platform.

By way of example, the second message may contain confirmation of execution (or notification of a failure of execution) from the communicating thing with respect to an actuation command contained in the first message. In another application, the second message may contain the results of measurements performed by the communicating thing.

According to particular characteristics, said IC card incorporates an application in compliance with the USIM application toolkit (USAT) standard.

By means of these provisions, it is possible to establish in convenient manner a communications channel between the mediation server and the IC card that implements the Internet protocol (IP). Communications between the mediation server and the IC card can thus advantageously pass via any IP network, such as an Internet network, the general packet radio service (GPRS) network, or the universal mobile telecommunications system (UMTS) network.

According to other particular characteristics, the communications channel between the IC card and said control device (referred to herein as the "local channel") implements the IP protocol.

According to still other particular characteristics, the functions of the communicating thing are represented as well-identified resources, and the IC card controls the identified resources by means of generic commands.

By means of these provisions, the control of the communicating thing by the IC card requires fewer execution resources than when said local channel implements the IP protocol. In this respect, it should be observed that the fact that the communications channel between the mediation server and the IC card implements the IP protocol does not imply that said local channel must also implement the IP protocol.

Correspondingly, the invention also relates to a security method for securing exchanges between a services platform and a communicating thing comprising a control device. Said method is remarkable in that it comprises the following steps:
    said services platform sending a message referred to as a "first" message to a server referred to as a "mediation" server;
    said mediation server encrypting said first message and sending the encrypted first message to said communicating thing;
    an IC card distinct from said control device and fitted to the communicating thing decrypting said encrypted first message; and
    said IC card transmitting the decrypted first message to said control device;
    the encryption and decryption operations being performed by means of at least one secret key shared between the mediation server and the IC card.

According to particular characteristics, said method further comprises the following steps:
    said control device transmitting a message referred to as a "second" message to said IC card;
    the IC card encrypting said second message;
    the communicating thing sending the encrypted second message to said mediation server; and
    the mediation server decrypting the encrypted second message and sending the decrypted second message to said services platform;
    the encryption and decryption operations being performed by means of at least one secret key shared by the mediation server and the IP card.

The advantages made available by this method are essentially the same as those made available by the security system briefly set out above.

The invention also provides a computer program downloadable from a communications networks and/or stored on a computer readable medium and/or executable by a microprocessor. The computer program is remarkable in that it comprises instructions for executing steps of the security method briefly set out above when it is executed on a computer.

The advantages made available by the computer program are essentially the same as those made available by said methods.

BRIEF DESCRIPTION OF THE DRAWINGS

Other aspects and advantages of the invention appear on reading the following detailed description of particular embodiments, given as non-limiting examples. The description refers to the accompanying figures, in which.

DETAILED DESCRIPTION OF ILLUSTRATIVE EMBODIMENTS

Figure 1:
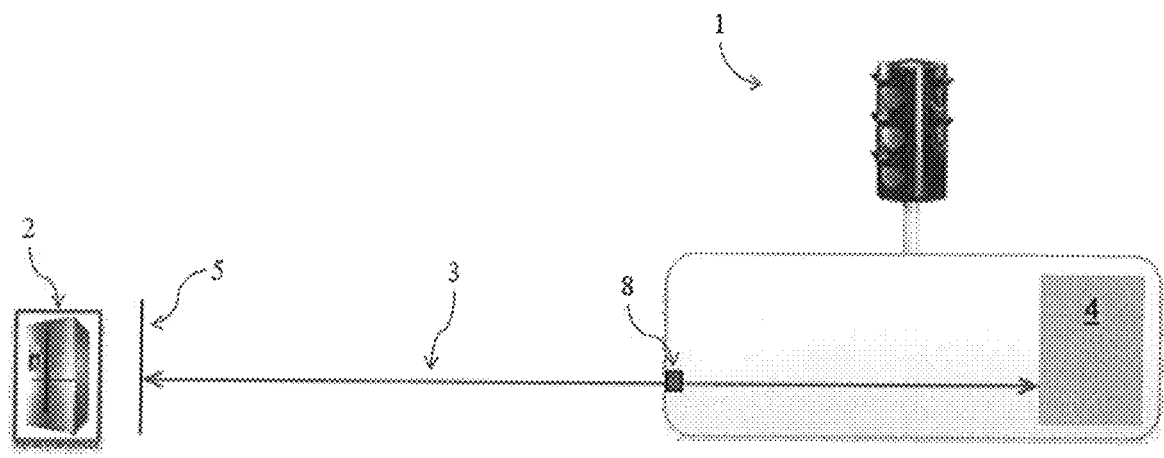
FIG. 1, described above, shows a system comprising a traffic light and a services platform connected via a prior art secure channel.

In the context of the present invention, consideration is given to a communicating thing 1 that is remotely controlled by a services platform 2.

In the invention, the communicating thing 1 has an IC card 7 that is distinct from the control device 4. Control messages exchanged between the control device 4 and the services platform 2 pass via the IC card 7 and a mediation server 6. Furthermore, the channel connecting the IC card 7 to the mediation server 6 is made secure by encrypting said messages, the encryption and decryption operations being performed by means of one or more secret keys shared between the IC card 7 and the mediation server 6. The secret key(s) may be stored in the IC card 7 in conventional manner.

It should be observed that in the invention the control device 4 only accepts control messages that come from the IC card 7.

There follows a description of two implementations of the security method of the invention.

In a first implementation, the services platform 2 actuates the communicating thing 1 remotely, e.g. in order to cause it to change the color of a light if the communicating thing 1 comprises traffic lights. This first implementation comprises the following steps.

In a step S1, the services platform 2 sends a message M containing an actuation command to the mediation server 6.

In a step S2, the mediation server 6 encrypts said message M.

In a step S3, the mediation server 6 sends the encrypted message to the communicating thing 1.

In a step S4, the encrypted message is decrypted by the IC card 7 fitted to the communicating thing 1.

Finally, in a step S5, the IC card 7 sends the decrypted message to the control device 4, which then actuates (or at least attempts to actuate) the communicating thing (in conventional manner).

Optionally, the communicating thing also sends a message in accordance with the invention to the services platform confirming that the actuation command has indeed been executed by the communicating thing (or notifying a failure of execution).

In a second implementation of the security method, the services platform 2 commands the communicating thing 1 to supply it with data that it has collected, e.g. a temperature measurement if the communicating thing 1 is a thermometer. This second implementation comprises the following steps.

In a step S'1, after the services platform has sent instructions in accordance with the invention, the control device 4 collects data (in known manner), and transmits a message M' containing that data to the IC card 7 fitted to the communicating thing 1.

In a step S'2, said message M' is encrypted by the IC card 7.

In a step S'3, the encrypted message is sent by the communicating thing 1 to the mediation server 6.

In a step S'4, the mediation server 6 decrypts the encrypted message.

Finally, in a step S'S, the mediation server 6 sends the decrypted message to the services platform 2.

Figure 2:
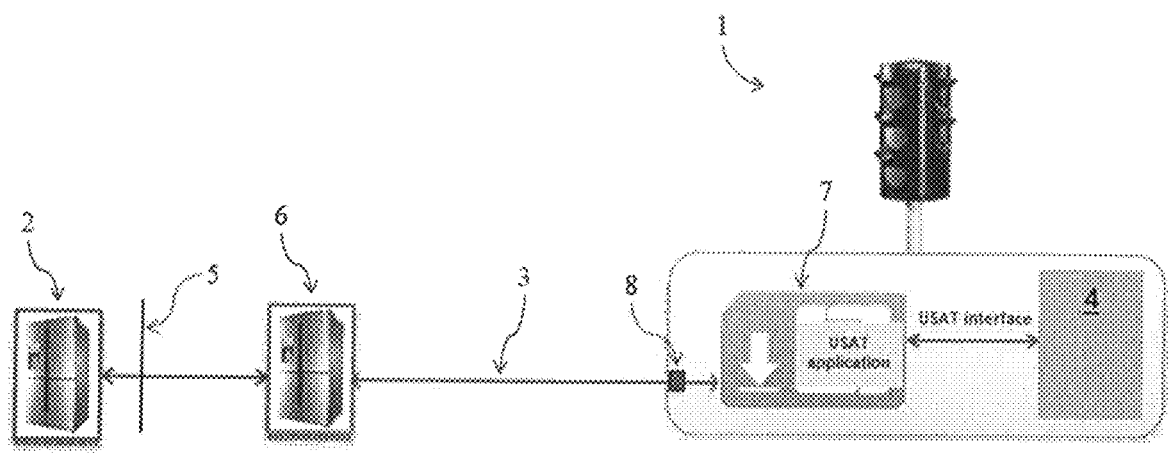
FIG. 2 shows a system comprising a traffic light and a services platform connected via a secure channel in an embodiment of the invention.

With reference to FIG. 2, there follows a description of an embodiment of the security system of the invention.

In this embodiment, the IC card 7 incorporates (and implements) an application in compliance with the USIM application toolkit (USAT) standard.

In this respect, it should be recalled that the 3GPP specification TS.31.111 and the European Telecommunications Standards Institute (ETSI) standard TS 102 223 define options for controlling a terminal by means of an IC card hosted therein: this set of options constitutes the USAT standard. The options made available by this standard include in particular:

controlling interaction between the terminal and its user via the screen of the terminal and/or via audible tones;

sending and receiving messages using the short message service (SMS), multimedia messaging service (MMS), and unstructured supplementary service data (USSD);

controlling incoming and outgoing calls;

executing "AT" commands (these are commands for controlling the management of the terminal accessing the mobile network and also the management of certain procedures of conversational services);

displaying a web page by a browser present in the terminal;

controlling the execution of an application hosted in the terminal, e.g. launching/stopping the application; and setting up an IP communications channel; the communications channel may be a local channel set up between the USAT application and an application in the terminal, or it may be a channel set up between the USAT application and a remote application in the network.

These procedures are controlled by commands referred to as "USAT commands". An application using these commands is referred to as a "USAT application".

In the present embodiment of the security system of the invention, the IC card 7 is thus provided with a USAT application. In addition, an IP channel is preferably set up between the IC card 7 and the mediation server 6; this may conveniently be done using the USAT command known as "Open Channel", that enables the IC card 7 to request the communicating thing 1 to set up this IP channel.

Several variants of this embodiment are described below.

Figure 3:
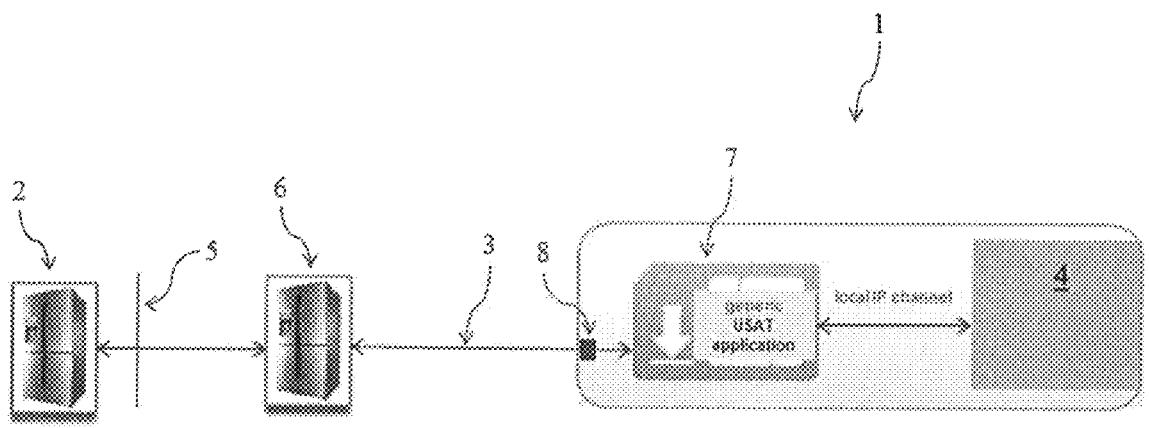
FIG. 3 shows a first variant of the embodiment shown in FIG. 2.

In a first variant, shown in FIG. 3:

an IP channel is set up between the IC card 7 and the control device 4, e.g. using the above-mentioned USAT command "Open Channel"; and the USAT application is generic.

This first variant presents in particular the advantage that the USAT application incorporated in the IC card 7 can operate with any type of communicating thing 1, since it does no more than relay the control messages.

Figure 4:
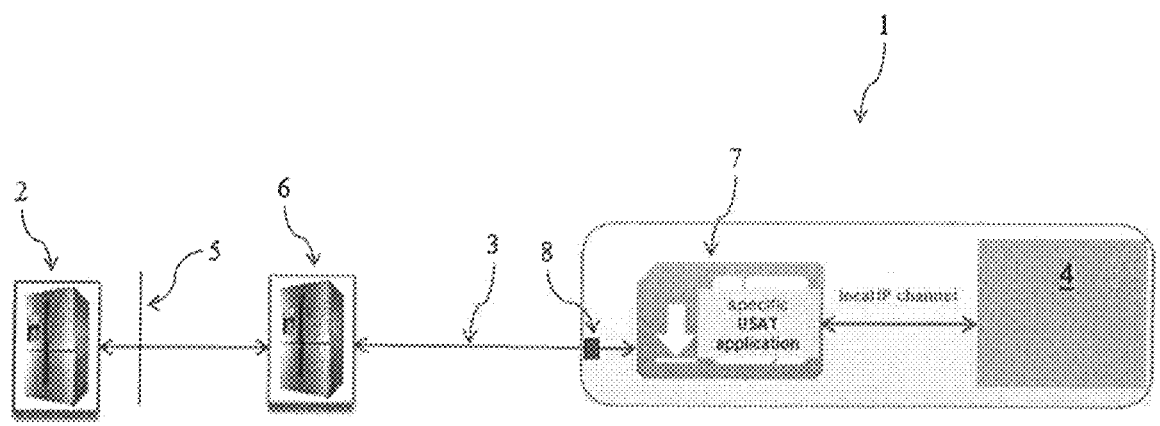
FIG. 4 shows a second variant of the embodiment shown in FIG. 2.

In a second variant, shown in FIG. 4, an IP channel is set up between the IC card 7 and the control device 4, as in the first variant.

However, in this second variant, instead of being generic, the USAT application is specific to the service supplied by the communicating thing 1 and is suitable for implementing suitable service software; the USAT application is thus not restricted to relaying messages between the services platform and the control device 4.

Since the USAT application is specific to the service and to the type of communicating thing 1, it cannot be incorporated by construction in all IC cards that are for performing the invention. The USAT application for a given service may be pre-provisioned in the IC card for that service, or it may be downloaded and installed in the IC card after the communicating thing 1 has been put into operation, e.g. by means of the over-the-air (OTA) mechanism.

An advantage of this second variant is that it makes it possible to transfer the execution of a portion of the service logic (intelligence) to the IC card; this makes it possible to benefit from the execution capabilities of the IC card and to offload the services platform 2.

Nevertheless, it should be observed that in the first and second variants, the use of a local channel implementing the IP protocol implies operation that is somewhat complex, and that results in particular in IP addresses being allocated, the IP channel being maintained, and commands being encapsulated in IP packets.

Figure 5:
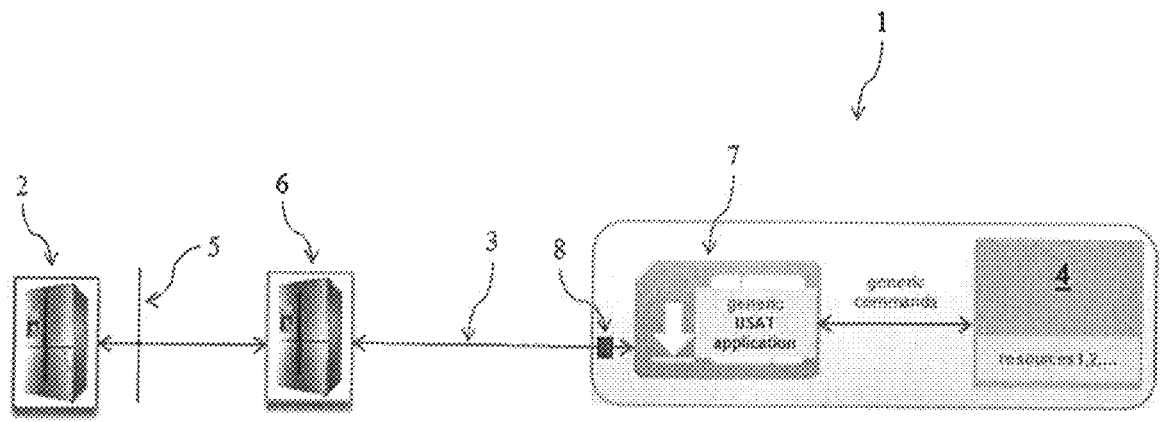
FIG. 5 shows a third variant of the embodiment shown in FIG. 2.

That is why, in a third variant, as shown in FIG. 5, the functions of the communicating thing 1 are represented as being well-identified resources; for example, if the communicating thing 1 is an oven, it is possible to identify a "thermostat" resource (capable of taking a series of values corresponding to a range of accessible temperatures), and a "heating mode" resource (capable of taking one value for a "normal" mode and another value for a "convection" mode).

The services platform 2 knows the identities of the resources corresponding to the functions of the communicating thing 1, and can use messages in a standard format (i.e. of standardized syntax and semantics), e.g. the hypertext transfer protocol (HTTP) format, in order to manipulate the values of these resources.

Generic commands are then defined for enabling the USAT application to control these resources; by way of example, these generic commands may comprise a "READ" command for reading the current value of a resource, and an "UPDATE" command for modifying the value of a resource. Specifically, the ETSI standard TS 102 690 ("Machine-to-machine communications (M2M); functional architecture") and TS 102 921 ("Machine-to-machine communications (M2M); mla, dla and mld interfaces") define syntax for representing the functions of a terminal as resources that can be controlled with representational state transfer (REST) technology; this third variant thus combines REST technology with USAT technology.

Furthermore, in this third variant, the USAT application is generic as it is in the first variant (described above with reference to FIG. 3).

This third variant presents in particular the following advantages:
- most communicating things have a small number of functions; the functions are thus easily identifiable; and
- the use of generic USAT commands makes it possible to avoid setting up an IP channel between the IC card 7 and the control device 4, thereby reducing operating complexity; the USAT application thus requires fewer execution resources, which is particularly advantageous, specifically since the resources of an IC card are relatively limited.

Figure 6:
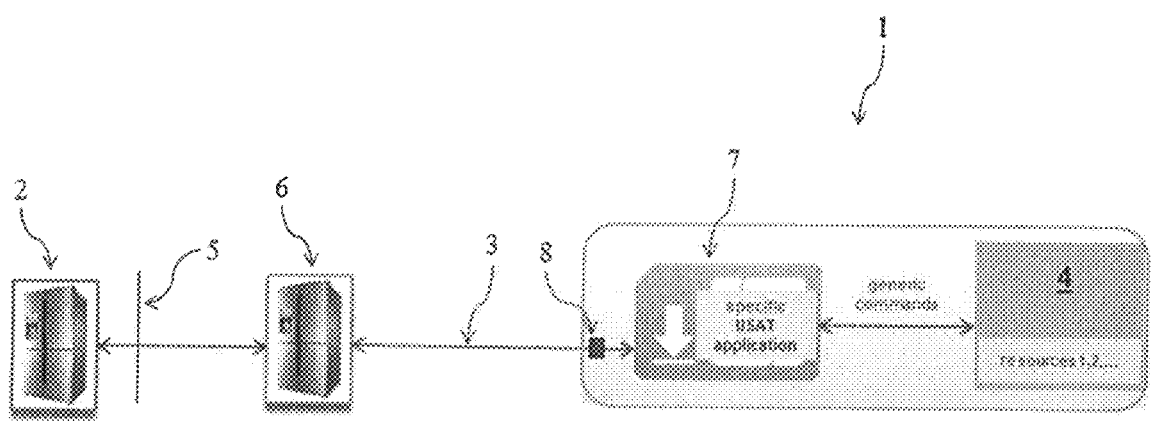
FIG. 6 shows a fourth variant of the embodiment shown in FIG. 2.

A fourth variant, shown in FIG. 6, is analogous to the second variant (described above with reference to FIG. 4) in that the USAT application is not generic: it is specific to the service and suitable for implementing a certain service logic; the USAT application is not restricted to relaying messages between the services platform and the control device 4.

An advantage of this fourth variant is thus that it enables execution of a portion of the service logic (generic) to be transferred to the IC card; this makes it possible to benefit from the execution capacities of the IC card, and to offload these services platform 2.

Since the USAT application is specific to the service and to the type of communicating thing 1, it cannot be incorporated by construction in all IC cards that are to implement the invention. The USAT application for a given service may be pre-provisioned in IC cards for that service, or downloaded and installed in the IC card after the communicating thing 1 has been put into operation, e.g. by means of the OTA mechanism.

Finally, unlike the second variant, the functions of the communicating thing 1 are represented in this example as resources that are well identified, and the USAT application controls these identified resources by means of generic commands that are analogous to the generic commands used in the third variant (described above with reference to FIG. 5), with the advantages that stem therefrom.

Variants other than the four above-described variants are naturally possible within the ambit of the invention.

Finally, it should be observed that the invention may be implemented within a communicating thing, or within a mediation server, by means of software and/or hardware components.

The software components may be incorporated in a conventional computer program for managing a network node. That is why, as mentioned above, the present invention also provides a computer system. In conventional manner, the computer system comprises a central processor unit using signals that control a memory, an input unit, and an output unit. Furthermore, the computer system may be used to execute a computer program including instructions for performing any of the methods of the invention.

Specifically, the invention also provides a computer program downloadable from a communications network and including instructions for executing steps of a method of the invention when it is executed on a computer. The computer program may be stored on a computer-readable medium and may be executable by a microprocessor.

The program may use any programming language, and may be in the form of source code, object code, or code intermediate between source code and object code, such as in a partially compiled form, or in any other desirable form.

The invention also provides a data medium that may be non-removable, or partially or totally removable, that is readable by a computer, and that comprises instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any one of the methods of the invention.

Although the present disclosure has been described with reference to one or more examples, workers skilled in the art will recognize that changes may be made in form and detail without departing from the scope of the disclosure and/or the appended claims.

The invention claimed is:

1. A security system for making secure communications between a services platform and a communicating device suitable for performing actions commanded by the services platform, wherein the system comprises the services platform, the communicating device and a mediation server, and wherein:
the mediation server comprises a processor configured to receive a first control message from said services platform, encrypt said first control message, and send the encrypted first control message to said communicating device, said first control message comprising one or more commands for actuating the communicating device to perform one or more actions,
the communicating device comprises a control device and an IC card that is distinct from said control device and that intercepts all the communications between the services platform and the control device, said IC card including a processor configured to decrypt said encrypted first control message and send the decrypted first control message to the control device, wherein encryption and decryption operations of the mediation server and the IC card are performed using at least one secret key shared between the mediation server and said IC card; and
said control device actuates the communicating device to perform said one or more actions according to the one or more commands comprised in said decrypted first control message,
wherein:
said IC card incorporates an application in compliance with a USIM application toolkit (USAT application) standard;
said USAT application is specific to a service supplied by the communicating device; and
said USAT application is configured to implement service logic relating to the service.

2. The security system according to claim 1, wherein said processor of said IC card is further configured to perform acts comprising:
receiving a message, referred to as a "second" message, from said control device, and encrypting said second message,
and wherein said mediation server is further configured to receive the encrypted second message from said communicating device, decrypt said encrypted second message, and send the decrypted second message to said services platform, wherein encryption and decryption operations performed for the second message are performed using at least one secret key shared between said mediation server and the IC card.

3. The security system according to claim 1, further comprising a communications channel between the IC card and said control device, which implements the IP protocol.

4. The security system according to claim 1 wherein said communicating device implements functions represented as well-identified resources, and said IC card controls said identified resources by using generic commands.

5. The security system according to claim 1, wherein:
functions of the communicating device are represented by resources having identities that are known by the services platform; and
the first control message sent by the services platform manipulates at least one value of at least one of the resources.

6. The security system according to claim 5, wherein the first control message is in HTTP format.

7. The security system of claim 1, wherein the service is selected from the group consisting of home automation services, town management services and health services.

8. A security method for securing communications between a services platform and a communicating device, said communicating device being suitable for performing actions commanded by the services platform, said communicating device comprising a control device and an IC card that is distinct from said control device and that intercepts all the communications between the services platform and the control device, the method comprising the following acts:
said services platform sending a mediation server a first control message comprising one or more commands for actuating the communicating device to perform one or more actions;
said mediation server encrypting said first control message and sending the encrypted first control message to said communicating device;
said IC card decrypting said encrypted first control message using a processor of the IC card;
said IC card transmitting the decrypted first control message to said control device; and
said control device actuating the communicating device to perform said one or more actions according to the one or more commands comprised in said decrypted first control message;
wherein:
the encrypting and decrypting acts being performed using at least one secret key shared between the mediation server and the IC card;
said IC card incorporates an application in compliance with a USIM application toolkit (USAT application) standard;
said USAT application is specific to a service supplied by the communicating device; and
said USAT application is configured to implement service logic relating to the service.

9. The security method according to claim 8, wherein the method further comprises the following acts:
said control device transmitting second message to said IC card;
the IC card encrypting said second message;
the communicating device sending the encrypted second message to said mediation server, and
the mediation server decrypting the encrypted second message and sending the decrypted second message to said services platform;
the encrypting and decrypting acts performed with respect to the second message being performed using at least one secret key shared by the mediation server and the IP card.

10. The security method according to claim 8, wherein:
functions of the communicating device are represented by resources having identities that are known by the services platform; and
the one or more actions includes manipulating at least one value of at least one of the resources based on the one or more commands in the decrypted first control message.

11. The security method according to claim 10, wherein the first control message is in HTTP format.

12. The security method according to claim 8, wherein the service is selected from the group consisting of home automation services, town management services and health services.

13. At least one non-transitory computer-readable, non-removable, or partially or totally removable data storage medium comprising computer program code instructions for executing a security method for securing communications between a services platform and a communicating device when the instructions are executed by at least one processor, said communicating device being suitable for performing actions commanded by the services platform, said communicating device comprising a control device and an IC card that is distinct from said control device and that intercepts all the communications between the services platform and the control device, the method comprising the following acts:

said services platform sending a mediation server a first control message comprising one or more commands for actuating the communicating device to perform one or more actions;

said mediation server encrypting said first control message and sending the encrypted first control message to said communicating device;

said IC card decrypting said encrypted first control message using a processor of the IC card;

said IC card transmitting the decrypted first control message to said control device; and said control device actuating the communicating device to perform said one or more actions according to the one or more commands comprised in said decrypted first control message, wherein:

the encrypting and decrypting acts being performed using at least one secret key shared between the mediation server and the IC card;

said IC card incorporates an application in compliance with a USIM application toolkit (USAT application) standard;

said USAT application is specific to a service supplied by the communicating device; and said USAT application is configured to implement service logic relating to the service.

14. The data storage medium of claim 13, wherein:

functions of the communicating device are represented by resources having identities that are known by the services platform; and the one or more actions includes manipulating at least one value of at least one of the resources based on the one or more commands in the decrypted first control message.

15. The data storage medium according to claim 14, wherein the first control message is in HTTP format.

16. The data storage medium of claim 13, wherein the service is selected from the group consisting of home automation services, town management services and health services.

* * * * *